(12) United States Patent
Johnson

(10) Patent No.: US 6,740,245 B2
(45) Date of Patent: May 25, 2004

(54) NON-CHEMICAL WATER TREATMENT METHOD AND APPARATUS EMPLOYING IONIZED AIR PURIFICATION TECHNOLOGIES

(75) Inventor: Dennis E. J. Johnson, Colorado Springs, CO (US)

(73) Assignee: Enerox Technology LLC, Colorado Springs, CO (US)

(*) Notice: Subject to any disclaimer, the term of this patent is extended or adjusted under 35 U.S.C. 154(b) by 142 days.

(21) Appl. No.: 10/104,713

(22) Filed: Mar. 25, 2002

(65) Prior Publication Data

US 2002/0185452 A1 Dec. 12, 2002

Related U.S. Application Data

(60) Provisional application No. 60/278,477, filed on Mar. 26, 2001.

(51) Int. Cl.[7] ............................ C25C 7/00; C02F 1/467
(52) U.S. Cl. .................... 210/748; 210/764; 210/192; 210/206; 210/243; 422/186.04; 422/186.3; 422/29; 204/157.46; 204/157.5; 204/242
(58) Field of Search .......................... 210/748, 764, 210/192, 198.1, 205, 206, 243, 540, 532.1; 422/186, 186.04, 186.3, 305, 29; 204/157.46, 157.5, 242, 660

(56) References Cited

U.S. PATENT DOCUMENTS

| | | | | |
|---|---|---|---|---|
| 5,424,032 A | * | 6/1995 | Christensen et al. | 422/14 |
| 5,443,719 A | * | 8/1995 | Johnson et al. | 210/101 |
| 5,597,479 A | * | 1/1997 | Johnson | 210/192 |
| 5,616,250 A | * | 4/1997 | Johnson et al. | 210/695 |
| 5,622,622 A | * | 4/1997 | Johnson | 210/192 |
| 5,635,059 A | * | 6/1997 | Johnson | 210/192 |
| 5,685,994 A | * | 11/1997 | Johnson | 210/748 |
| 6,517,713 B2 | * | 2/2003 | Gargas | 210/192 |
| 2002/0170816 A1 | * | 11/2002 | Leffler et al. | 204/157.46 |

FOREIGN PATENT DOCUMENTS

JP         50109889 A    *   7/1975

* cited by examiner

Primary Examiner—Frank M. Lawrence
(74) Attorney, Agent, or Firm—Michael de Angeli

(57) ABSTRACT

Contaminated water is disinfected by admixture of a highly reactive gas stream containing ions of oxygen and nitrogen, formed by exposure of air to short-wavelength ultraviolet radiation, and of chlorine, formed by electrolysis of a brine solution. Solids removal can be accomplished by electrophoresis in the same unit employed for electrolysis of brine to release chlorine, or in a separate unit.

23 Claims, 10 Drawing Sheets

NON-CHEMICAL WATER TREATMENT METHOD AND APPARATUS EMPLOYING IONIZED AIR PURIFICATION TECHNOLOGIES

CROSS-REFERENCE TO RELATED APPLICATION

This application claims priority from Provisional Application Ser. No. 60/278,477, filed Mar. 26, 2001.

FIELD OF THE INVENTION

This invention relates to a system and methods for the efficient generation of ionized gas (vapor) atoms and molecules for water and/or wastewater disinfection, and more generally, to methods and apparatus for non-chemical methods of water treatment, that is, avoiding use of conventional chemical reagents and processes, such as treatments involving one or more of polymers, coagulants, sterilizers, and disinfectants. The invention provides non-chemical methods of water disinfection, coagulation, solids removal, decontamination, and highly efficient and economical purification.

APPLICATION OF AND BENEFITS PROVIDED BY THE INVENTION

Worldwide demand for water purification and contamination control has continued to grow along with the economic and environmental emphasis on water conservation. According to one aspect of the invention, various combinations of interchangeable process flow schemes that provide high efficiency modular purification and contamination control technology can be selected and optimized for the particular use involved. Such uses include, but are not limited to: non-chemical treatment of: commercial and industrial cooling water for bacterial elimination; treatment of hazardous and/or toxic industrial effluents; purification of wastewater for recycle or reuse; de-toxification and reuse of food processing water; life extension and reuse of machine tool coolants; laundry wastewater purification for reduction of sewer discharge; decontamination of marine ballast and bilge water; recycle and/or reuse of animal production water; and purification of sewage treatment and/or drinking water. The scope of the invention and its applications are literally global. The invention can be utilized for the non-chemical treatment, recovery, and recycling of water and wastewater, including the removal of solids and bacterial agents and microscopic contaminants. Further, the invention can be applied to provide zero discharge of chemically treated wastewater to the surrounding environment, and removes the vast majority of associated corrosion and maintenance problems from the water treatment operations.

BACKGROUND OF THE INVENTION

The methods of water disinfection most frequently used, and the art of water treatment in general, is most often represented by various hydro-separators, clarifiers, mechanical filters, and/or chemically oriented apparatus and flocculation/coagulation procedures (including chemical post-treatment) whereby impurities are removed from water. The basic types of known water treatment purification arrangements and their accompanying problems and limitations may be categorized generally as follows:

1. Non-regeneratable modular filters are one time use, short-term devices of inexpensive cartridge design that have restrictive low-flow and high head-loss pressure limitations. Typical filter materials are packed cellulose or fibrous/filament textiles that, at best, provide (at optimal flow) no better than a continuous 5–10 micron absolute particle size separation or filtration. Minor recognizable suspended solids in the water influent flow will quickly clog the filter media material within the cartridge and render the filter system involved inoperable. Where moderate and high flow rates are involved, replacement costs and down time are inordinately costly and burdensome. These canister/cartridge filters and separation units are usually non-compatible and fairly short-lived if exposed to oxidizing and corrosive chemical treatment agents within the contaminated water to be purified.

2. Chemical treatment methods typically include use of oxidizers, polymers, flocculants, and/or coagulants, and may also include use of chlorine for disinfection and sterilization. These methods are cost prohibitive and labor-intensive and can require high maintenance, as they can damage the associated waste treatment equipment component(s) system. Further, various chemical treatments involve health and safety risks leading to restrictions on their use and reduction of permitted exposure. Commonly, chemical process treatment methods lead to the generation of voluminous amounts of toxic chemical solids and sludges along with the associated environmental exposure liability problems; further, these methods may involve liability issues and regulatory agency controls due to the necessity of disposal of these hazardous substances.

3. Ozone generators, e.g., as conventionally offered as "Corona-Arc Generation" disinfection and treatment systems provide a high voltage electric arc or corona. These open spark discharges are conducive to potentially dangerous situations. Moreover, these systems require fairly high power and have relatively high maintenance requirements, and are expensive to operate in that they require a supply of low-humidity air (leading to continuous desiccator and dryer maintenance requirements) and further require high maintenance air-separation oxygen concentrator equipment. Problems due to potentially toxic exposure to ozone can also exist.

4. Reverse osmosis (R. O.) treatment systems, involving membrane separation of sub-micron particles from water, often present problems associated with shortened membrane life due to plugging, limited process flow capacity, and disinfection of the membrane so as to be free from contaminating biological agents and/or oily materials. The R.O. membrane is highly susceptible to fouling with biological growth; further, R.O. treatment systems are costly both as to initial cost and in operation, as they require substantial electrical power to provide the high pressure needed for operation, and due to their high maintenance requirements.

5. Traditional filtration systems employ one or more of carbon, anthracite, coal, paper, fibrous materials, "mixed media", and/or sand as a physical removal method, that is, to establish a solids separation and filtration process. These systems often involve operational problems such as early fouling of the filtration media, which often requires very frequent filter backwashing and adds difficulties relative to the disposal of large quantities of the backwashed materials. The backwash water may be very biologically active and alsol require disinfection, due to "bleed through" bacterial recontamination of the water being treated. Quite often, in order to maintain a steady-state level of solids removal and continuous purification efficiencies, the entire volume of filtration materials must be removed and replaced several times per year due to encrustment and contamination.

6. Ion exchange filters basically remove only dissolved ions and electrically charged colloidal solids; they rapidly plug in the presence of suspended solids. Even a moderate flow (50–100 GPM) ion exchange filter system represents a complex plumbing network involving unwieldy resin filter and/or "zeolite staged" containers and requires large regenerative acid and base tankage. Regeneration of the filter resin is complicated and is often incomplete due to the plugging of the resin pore spaces by the larger particle size suspended solids that gain entry into the flow. These systems have substantial flow rate restrictions limiting their practicality for larger commercial or general-purpose use. Thus, ion exchange filtration is suitable only for very select water treatment or specific wastewaters and also often involves high capital equipment purchase cost in addition to high repetitive media replacement and operational costs.

INVENTOR'S PRIOR ART

As explained in further detail below, the present invention encompasses multiple technological advancements, refinements, and/or alterations of the basic principles of applied water treatment as represented in one or more of the following U.S. Patents, as to each of which the present inventor is sole or joint inventor, and which are incorporated by reference herein.

Title. SYSTEM AND REACTOR FOR MIXING COAGULATING AGENTS INTO CONTAMINATED WATER FLOW, AND FOR REMOVING CONTAMINANTS THEREFROM U.S. Pat. No. 5,443,719 Issued: Aug. 22, 1995

Title: METHOD AND APPARATUS FOR WATER TREATMENT AND PURIFICATION USING GAS ION PLASMA SOURCE AND DISINFECTANT METAL ION COMPLEXES U.S. Pat. No. 5,635,059 Issued: Jun. 3, 1997

Title: ELECTRO-COALESCENCE/MAGNETIC SEPARATION (ECMS) SYSTEM AND COMPONENTS FOR REMOVAL OF CONTAMINANTS FROM WATER STREAMS, INCLUDING DESALINIZATION.

U.S. Pat. No. 5,597,479 Issued: Jan. 28, 1997

Title: METHOD, SYSTEM, AND REACTOR FOR MIXING COAGULATING AGENTS INTO A CONTAMINATED WATER FLOW, AND FOR REMOVING CONTAMINANTS THEREFROM U.S. Pat. No. 5,616,250 Issued: Apr. 1, 1997

Title: IMPROVED ULTRAVIOLET STERILIZER AND SOURCE OF IONIZED MOLECULES FOR ECMS REMOVAL OF CONTAMINANTS FROM WATER STREAMS U.S. Pat. No. 5,622,622 Issued: Apr. 22, 1997

Title: METHOD AND APPARATUS FOR WATER TREATMENT AND PURIFICATION USING GAS ION PLASMA SOURCE AND DISINFECTANT METAL ION COMPLEXES.

U.S. Pat. No. 5,685,994 Issued: Nov. 11, 1997

Title: APPARATUS AND PROCESSES FOR NON-CHEMICAL PLASMA ION DISINFECTION OF WATER U.S. Pat. No. 5,792,369 Issued: Aug. 11, 1998

OBJECTS OF THE INVENTION

The principle object of the invention is to provide extremely efficient, low maintenance, low energy cost modular water purification and contamination control technology for the non-chemical disinfection and contaminant separation of various types of water or wastewater streams. The water treatment and purification areas of particular interest include, but are not limited to, drinking water, ship ballast water, marine discharge wastewaters, commercial and industrial cooling water, industrial and commercial hazardous and/or toxic effluents, manufacturing process water, industrial machine tool coolants, sewage, and agricultural and food processing streams.

Specifically, the non-chemical water purification and disinfection technology of the invention exhibits higher treatment efficiency than more conventional water treatment methods that rely on chemicals, traditional filtration, reverse osmosis, ozone generators, etc, and also involves reduced energy costs. By eliminating the treatment chemicals, increasing sub-micron particle size solids separation and removal, and by very efficient destruction of bacteria and biological agents within the treated water through electrically-driven disinfection; a number of operational, maintenance and serious health and water treatment problems can be eliminated, resulting in the economic recovery of contaminated water, and ultimately in conservation, purification, and protection of shrinking drinking water supplies.

Accordingly, it is the ultimate object of the current invention to establish non-chemical water treatment disinfection and purification technologies that represent realistic, "user friendly", and cost effective answers to global water availability issues and concerns.

SUMMARY OF THE INVENTION

As in the inventor's prior patents incorporated by reference above, the system of the invention mixes an atmospheric air stream including a large portion of ionized, highly reactive oxygen and nitrogen vapor into a contaminated water stream to be treated, so that the ionized oxygen and nitrogen react with and kill biologically active organic species such as bacteria, viruses, fungi, amoebas, diatoms, and other microorganisms, thus disinfecting the water stream. The generation of the ionized vapors takes place within a gas ionization system providing particularly efficient, high rate production of the reactive nitrogen and oxygen ionized vapors. This unit is sometimes referred to herein as the NI—OX vapor ion generator, although use of this acronym is not to be taken to limit the invention to embodiments of equipment or processes that may be offered by the inventor and his affiliates under that or a similar tradename or mark.

The NI—OX trademark refers to the production of "ionized oxygen" and "ionized nitrogen" vapor gas ions. This vapor generator when incorporated with the other components of a system according to the invention provides a unique and highly efficient water treatment unit. As explained further below, the components are optimized to generate a plethora of highly reactive singlet oxygen and ionized nitrogen species from oxygen and nitrogen in air, under circumstances also encouraging secondary recombination with water vapor to produce additional disinfecting hydroxide and hydrogen peroxide gas vapor ions. The system is arranged so that the majority of the singlet oxygen ions do not have any opportunity to be converted back to lower energy, less reactive ground state configurations, characteristic of atmospheric oxygen species, but instead react with the ionized nitrogen ions that are formed simultaneously. This interaction sequence quickly stabilizes by production of a very reactive group of electron-rich, i.e., negatively charged, vapor molecules that is very effective in coagulating and disinfecting water. This group of ionized molecules is referred to as the NITROXYL vapor ion species. The NITROXYL vapor ion group represents a unique stand-alone water treatment, suitable for highly efficient treatment and water purification and decontamination. Again, use of this term as shorthand herein should not be construed to limit the invention, e.g., to any equipment produced by the inventor or his affiliates.

Acording to a further aspect of the present invention, in addition to the ionized oxygen and nitrogen species generated and used in ways similar to those disclosed in the inventor's prior patents, ionized chlorine gas molecules are generated by the electrolysis of brine. If generated in a separate vessel, the chlorine ions are injected into the water to be treated, along with additional oxygen and hydrogen ions also produced by the electrolysis. Alternatively, the chlorine ions can be produced by electrolysis of the water stream being treated (with additional brine added if needed), so that the chlorine ions are produced in situ. This electrolysis unit is known as the CLORIN generator, and the gas stream including ionized chlorine atoms as the CLORIN stream. Again, use of this term as shorthand herein should not be construed to limit the invention, e.g., to any equipment produced by the inventor or his affiliates.

The integration and co-interaction of the NITROXYL vapor ions generated in the NI—OX system with ionized chlorine, oxygen, and hydrogen produced in the CLORIN system according to the invention creates an entirely new family of very accelerated and aggressive disinfectants, oxidants, and coagulants known as CLORINOXYL vapor ions. As above, use of this term as shorthand herein should not be construed to limit the invention, for example, to any equipment produced by the inventor or his affiliates.

In one embodiment, the CLORIN gas stream is produced by electrolysis of the water to be treated (witrh brine added if necessary) between spaced parallel metallic plates, with direct current power applied to alternating ones thereof. The device thus assembled also provides electro-coalescence, in that sub-micron sized contaminants are attracted to the charged plates and agglomerate thereon. Lighter particles tend to float to the surface of the liquid, and can be separated and removed. Heavier particles tend to collect on the plates; when a significant quantity of particles has accumulated, their collective weight causes them to drop off the plates during periods when the charge is removed, e.g., during periodic polarity reversal, which is performed to prevent uneven erosion of the material of the plates and/or accumulation of scale thereon. The fallen particles can be collected and removed as a sludge or the like. In this way the same device serves to generate the CLORIN disinfectant gas stream and as a solids separation and removal device. Alternatively, solids removal can be performed using equipment and techniques disclosed in the applicant's prior patents listed above, or otherwise.

BRIEF DESCRIPTION OF THE DRAWINGS

The invention will be better understood if reference is made to the accompanying figures, in which.

DESCRIPTION OF THE PREFERRED EMBODIMENTS

As indicated above, the essential principle of the water treatment methods and apparatus provided according to the invention is to provide essentially complete destruction of biological contaminants, that is, microorganisms of all types, such as parasites, bacteria, fungi, viruses, and algae, followed by their removal from the water stream, coupled with separation and removal of non-biological contaminants as may be present.

As set forth in applicant's prior patents referred to above, the biological destruction process is accomplished principally by providing streams of ionized gas atoms and molecules; according to the present invention, these are chiefly various highly reactive ionic species of oxygen, chlorine and nitrogen. Ionized oxygen and nitrogen of various species are produced by exposing a stream of air to intense ultraviolet (UV) radiation, and in some cases to an electric field; ionized chlorine, along with additional ionized oxygen and hydrogen Is produced by electrolysis of brine. A stream of vapor including high concentrations of these ions is then rapidly mixed with the water stream to be treated, so that the ions do not have time to recombine, and under circumstances that ensure thorough mixing. This has the effect of lysing and killing the microorganisms and other biological agents present in the water stream, essentially by oxidizing and reducing reactions.

The killed microorganisms and other contaminants can then be removed from the water stream in one or more of several separation devices, which can be incorporated in the vessel in which the vapor/water mixing takes place. As discussed further below, electro-coalescence, as taught by applicant's prior patents, can be employed to cause the contaminants to flocculate and settle, simplifying their removal; electrostatically-chargeable media may also be employed.

Figures 1, 7:
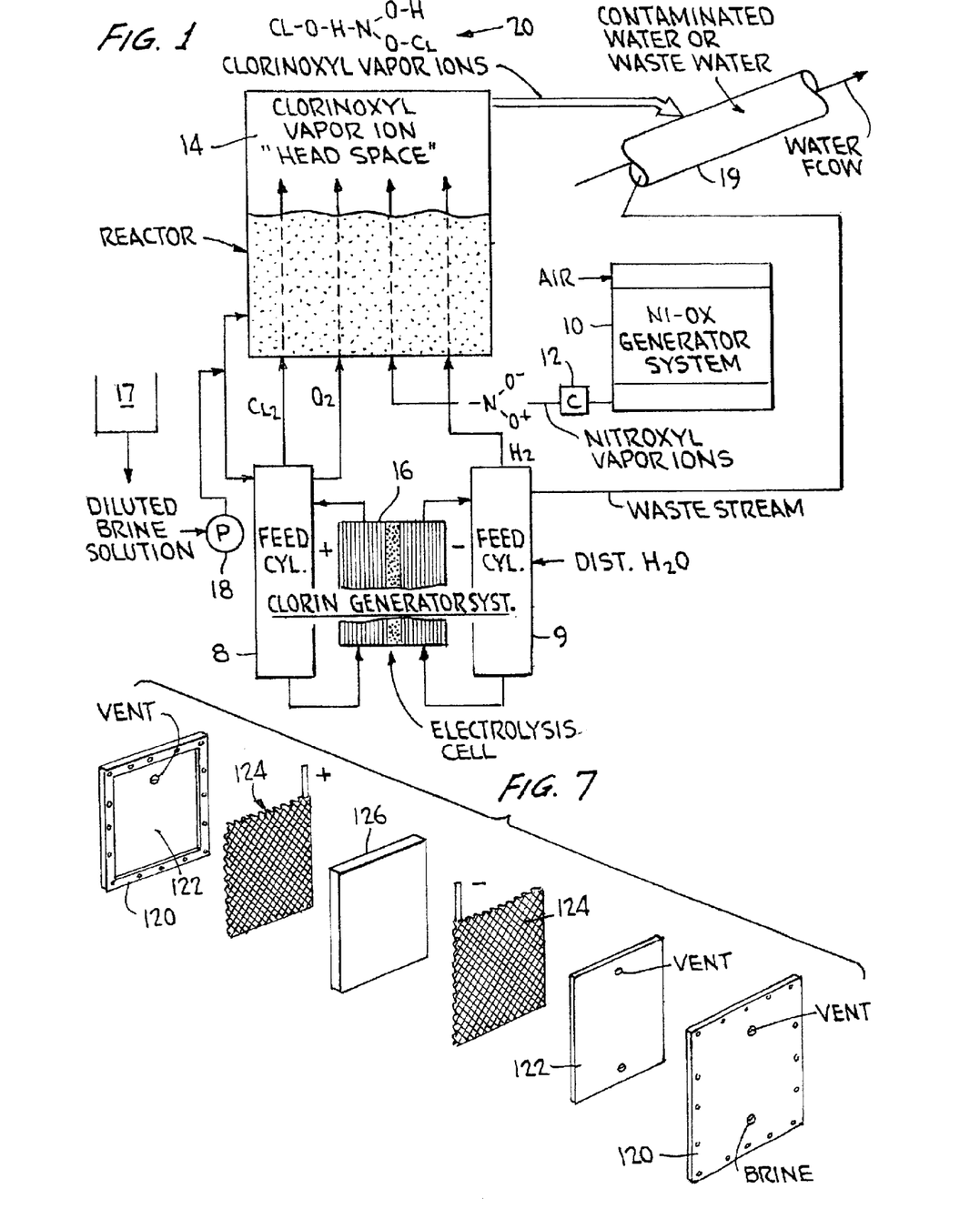
FIG. 1 shows a schematic diagram of one embodiment of a water treatment system incorporating the invention.
FIG. 7 is an exploded diagrammatic view of one embodiment of an electrolysis membrane cell used to generate ionized chlorine, and additional oxygen and hydrogen vapor ions.
Figure 3:
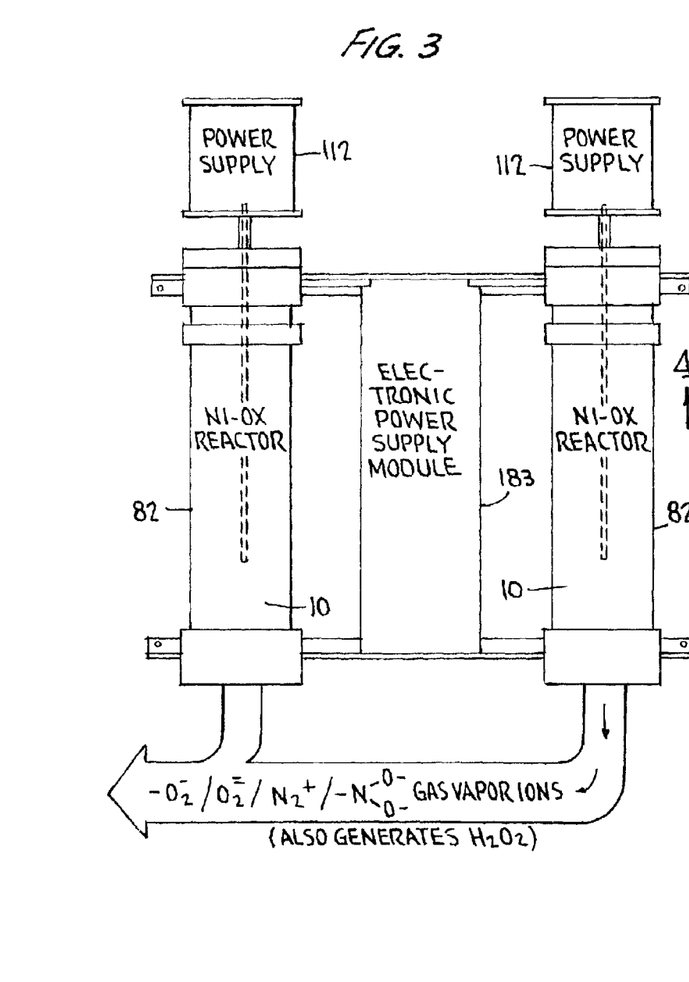
FIG. 3 is a diagrammatic view of a first embodiment of an improved unit for generating streams of various species of ionized oxygen and nitrogen vapor ions as may be employed in implementing the invention.

FIG. 1 shows a typical system arrangement. Item 10 is an ion generator unit, several embodiments of which are shown herein; one embodiment, for example, is shown in FIG. 3, and another by FIGS. 4 and 5. The ion generator unit produces a stream of various species of ions of oxygen and nitrogen in air. This stream of ions of oxygen and nitrogen in air is referred to in the drawings, and elsewhere, as the "NI—OX" stream; again, use of this acronym does not limit the invention to embodiments of equipment or processes that may be offered by the inventor and his affiliates under that or a similar tradename or mark. The listing of ionic species shown as being produced by ion generator 10 is further expanded upon in FIG. 6.

The stream of ions in air is compressed by compressor 12, for injection into a mixing tank 14, which can be readily fabricated of PVC pipe components. Tank 14 contains a quantity of brine, which is conveniently employed for mixing the gas streams. Brine solution, simply comprising food-grade salt in water, is supplied to tank 14 from a reservoir 17 by a metering pump 18 Brine is supplied to a brine electrolysis cell 16, e.g., as detailed in FIG. 7, by feed tank 8, and distilled water, for flushing the electrolysis cell at intervals, is provided by feed tank 9. DC power applied to the brine electrolysis cell 16 causes ionized atoms and molecules of chlorine, oxygen, and hydrogen to be released from the solution. This mixture of ionized gaseous atoms and molecules, which is further detailed in FIG. 9, is referred to in the drawings, and elsewhere, as the "CLORIN" stream; again, use of this acronym does not limit the invention to embodiments of equipment or processes that may be offered by the inventor and his affiliates under that or a similar tradename or mark. In alternative embodiments shown in FIGS. 2, 8 and 8A, the brine electrolysis may be performed in the same apparatus in which coalescence and separation of solids occurs.

Referring again to the FIG. 1 embodiment, the CLORIN gas stream is piped to the brine tank 14, where it is mixed with the NI—OX stream. The resulting gas stream, the principal active components of which are listed at 20 (and explained in detail in FIG. 9), is then mixed with water to be treated, as indicated at 19a the ionized gases are extremely effective in killing all manner of microorganisms in the water stream, thus essentially sterilizing the water stream in accordance with the objects of the invention, This combined stream of reactive vapor ions in air is referred to in the drawings, and elsewhere, as the "CLORINOXYL" stream; again, use of this acronym does not limit the invention to embodiments of equipment or processes that may be offered by the inventor and his affiliates under that or a similar tradename or mark.

Figure 8:
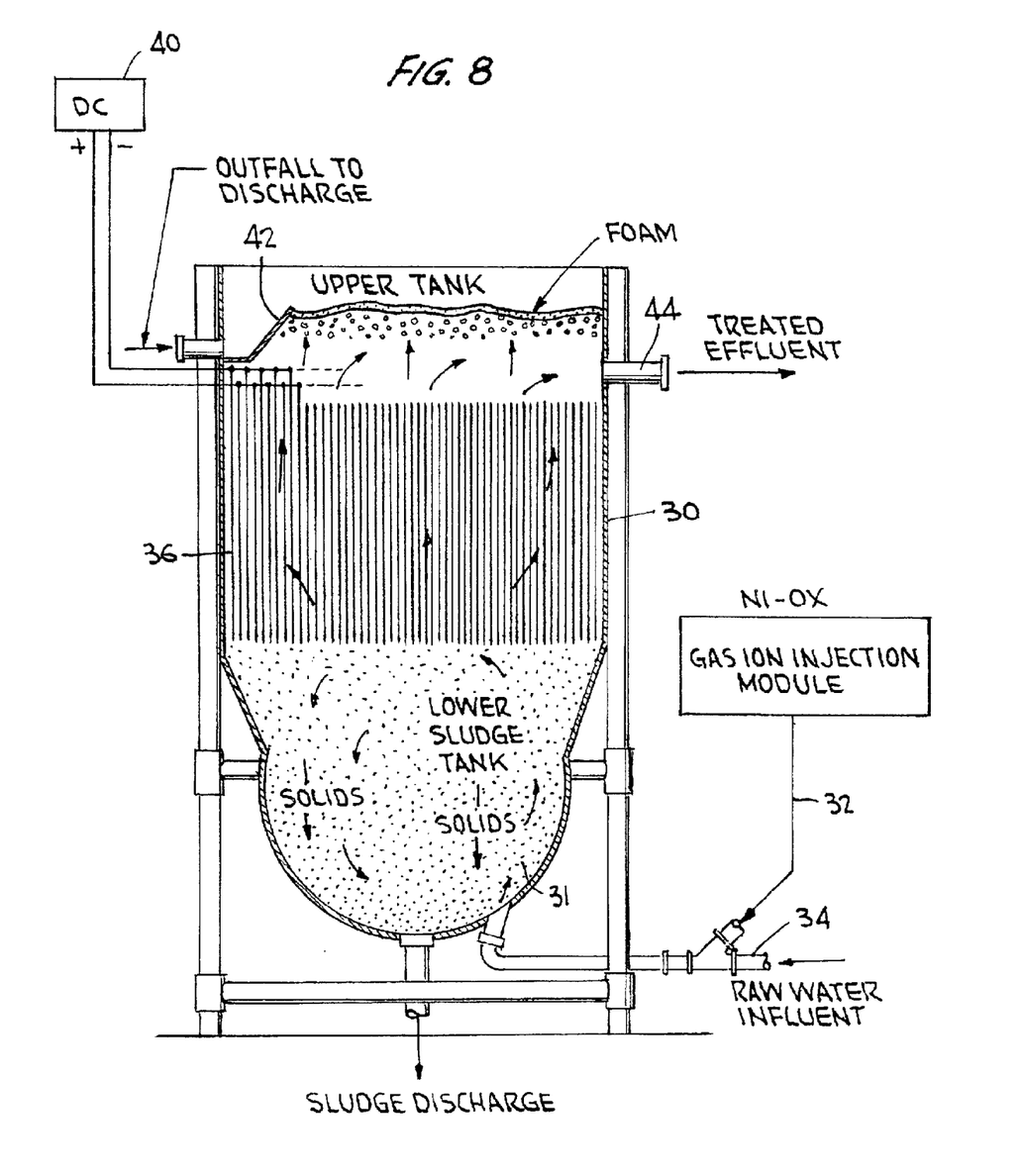
FIG. 8 is a diagrammatic view of an electrolysis plate cell unit used to generate ionized chlorine and additional oxygen and hydrogen vapor ions, and to perform solids removal.
Figure 9:
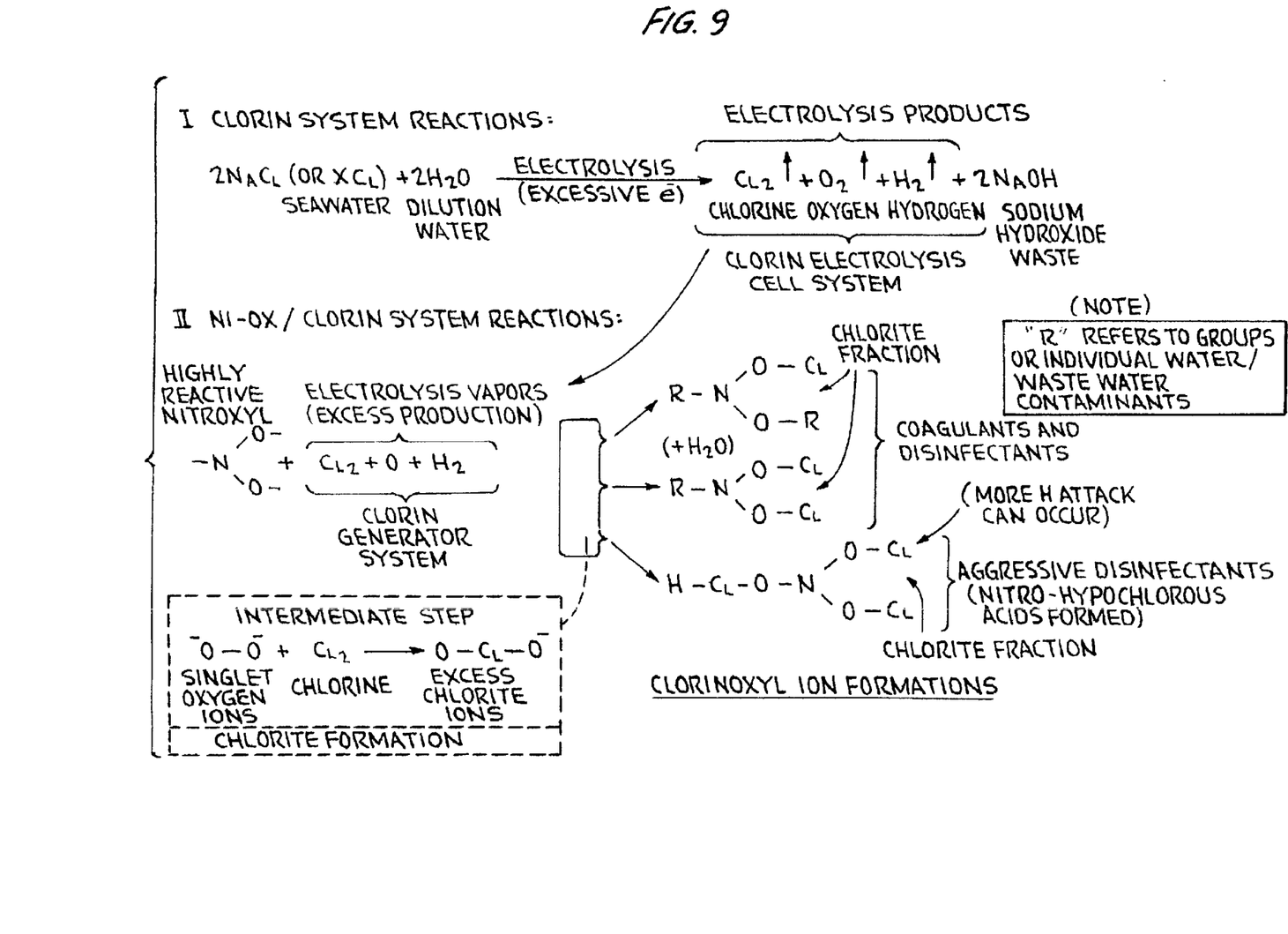
FIG. 9 illustrates typical vapor ion species that are formed in operation of the chlorine ion generating system of the invention.

FIG. 8 shows one preferred form of primary separation vessel 30 in which the CLORINOXYL mixture of ionized gas atoms and molecules is generated in situ and reacts with the water stream to be treated As indicated, the NI—OX stream is injected at 32 into the water stream 34 just prior to entry into vessel 30. If desired, the water stream can be passed through a venturi, to provide a partial vacuum drawing the NI—OX stream thereinto, as discussed in various of applicant's prior patents. Further, if the water stream to be treated does not include sufficient salt to release chlorine upon electrolysis, brine may be added. The NI—OX vapor stream is admitted to the lower portion 31 of vessel 30 together with the water stream to be treated, under circumstances (i.e., high pressure of the injected water stream) that ensure turbulent conditions in the lower portion of the vessel, so that although contaminant solids settle out and form a sludge, good mixing of the NI—OX gas stream and water stream occurs. The mixed stream gradually percolates upwardly in vessel 30, until it occupies the interstitial spaces between a number of paired metallic electrode plates 36. These plates can be stainless Steel or corrosion resistance, or can be made of sacrificial aluminum material, for promoting further precipitation of contaminants from the water stream. Alternate ones of the plates are connected to positive and negative terminals of a DC power supply 40, so as to establish electric fields between each successive pair of plates 36; that is, alternate ones of plates 36 serve as anode and cathode. The plates may be corrugated, with the corrugations oriented transversely to the direction of flow, to increase their surface area and create turbulence. As further detailed below, under these circumstances salt in the water is electrolyzed, releasing ionized gaseous chlorine atoms and molecules, as well as further ionized hydrogen and oxygen; these ionized gas atoms and molecules, comprising the CLORIN stream, mix with the NI—OX stream previously injected to form the CLORINOXYL stream. The CLORINOXYL stream, as mentioned, is extremely efficacious in killing all manner of biological contaminants in the water stream.

The electric field existing between each pair of plates 36 causes the killed microorganisms, as well as other dissolved or suspended solids to flocculate, i.e., to agglomerate into a low-density foam floating to the top of the water in vessel 30. The level of the water in vessel 30 is controlled so that the foam and floating scum pass over a weir 42 and are disposed of while the treated water is withdrawn from an exit port 44, as indicated. At the same time, heavier solids tend to collect on the plates, due to electrostatic attraction. These heavier solids also agglomerate. When the polarity of the DC power is reversed which occurs at intervals of on the minutes or hours, to prevent uneven erosion of the plates and limit accumulation of scale thereon, the heavier solids fall off the plates and are collected as a sludge in the bottom of the vessel.

The treated effluent withdrawn at 44 from the primary separation vessel 30 can then be passed to a second separation vessel (not shown), if necessary for final polishing, i.e., solids separation and removal Such a second separation vessel may amount to a refinement of the "ECMS" system described in detail in the applicant's U.S. Pat. No. 5,597, 479. In essence, water to be treated is admitted to a vessel, the lower portion of which is filled with a bed of polarizable granular media, such as crushed glass, alumina, ceramic materials, activated charcoal, coal fines, or aluminum silicates. Several electrodes extend well into the bed, so that when a DC bias is applied, the media is electrically polarized. This has the effect of causing solids to be attracted to the media, providing sub-micron filtration, In order to ensure that the water to be treated is intimately mixed with the media, water is withdrawn from the vessel by way of an underdrain assembly comprising a number of perforated tubes connected to an outlet manifold. Similarly, the inlet can be implemented by admitting the water to the vessel by way of a number of nozzles connected to an inlet manifold; further NI—OX, CLORIN, or CLORINOXYL gas streams can be added if further disinfection seems desirable The media can be backflushed from time to time by reversing the direction of flow.

Figure 8A:
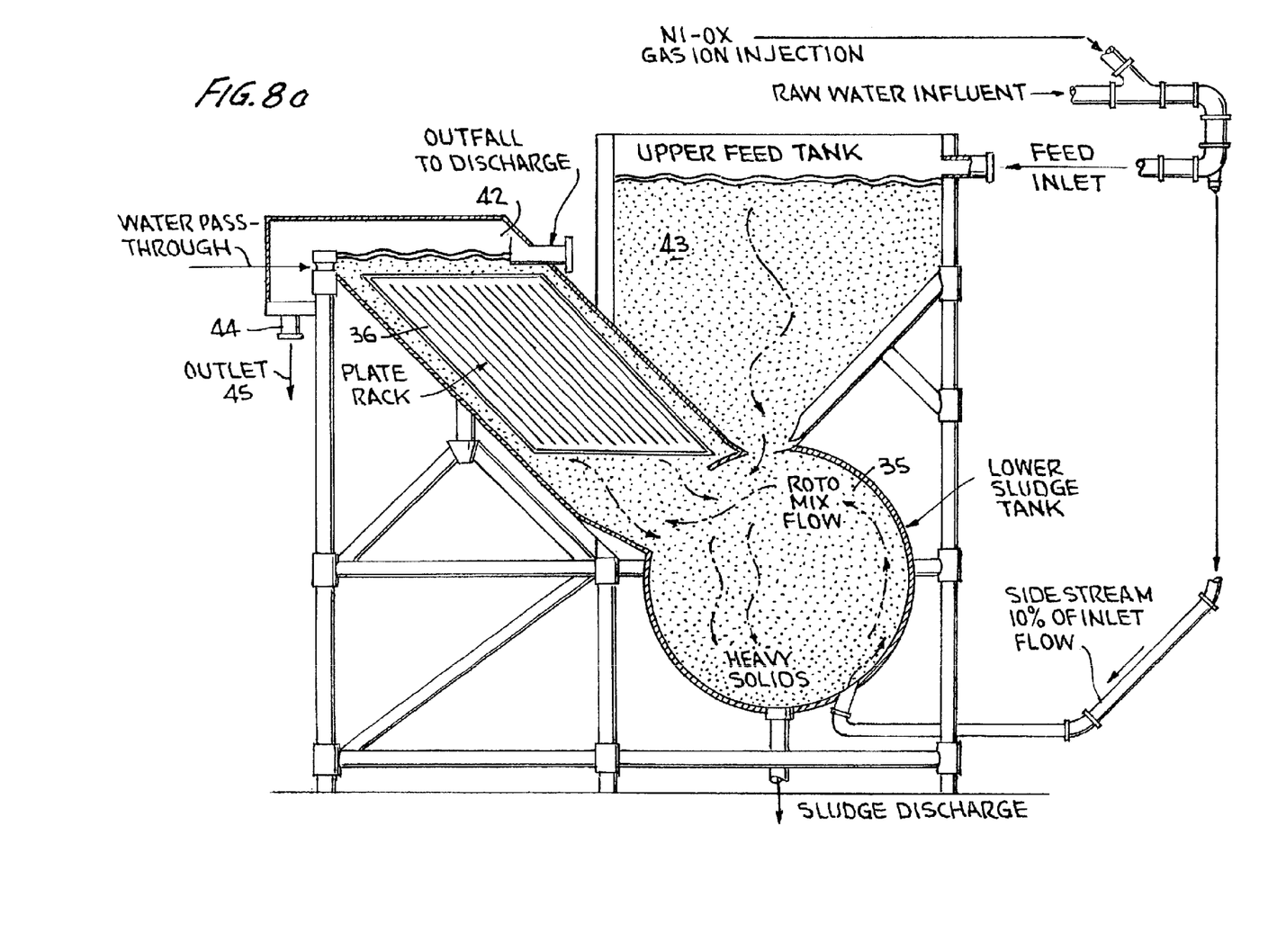
FIG. 8A is a similar diagrammatic view of a modified version of the FIG. 8 embodiment of an electrolysis plate cell used similarly to generate ionized chlorine and additional oxygen and hydrogen vapor ions, and to perform solids removal.

FIG. 8A shows a modified embodiment of the system of FIG. 8. In the FIG. 8A version, the major portion of the influent water to be treated is admitted, after injection of the NI—OX gas stream, to an upper feed tank 43. This influent flows downwardly into a lower sludge tank 31, where heavier solids can settle out. The remaining portion (on the older of 10% of the total) of the influent is injected into the lower tank to ensure good mixing. The liquid to be treated flows upwardly, between inclined spaced metal plates 36 bearing opposite charges; the inclination increases the residence time of the water between the plates, increasing the flocculation, without increasing the space required. As above, the electric field created therein encourages flocculation of contaminants such as killed microorganisms, which then form a foam removed by weir 42, as above, and separating treated water for removal at 44; at the same time, heavier solids are agglomerated on plates 36, dropping off during polarity reversals as indicated at 45 to form a sludge, and the CLORIN gas stream is formed between plates 36.

Figure 4:
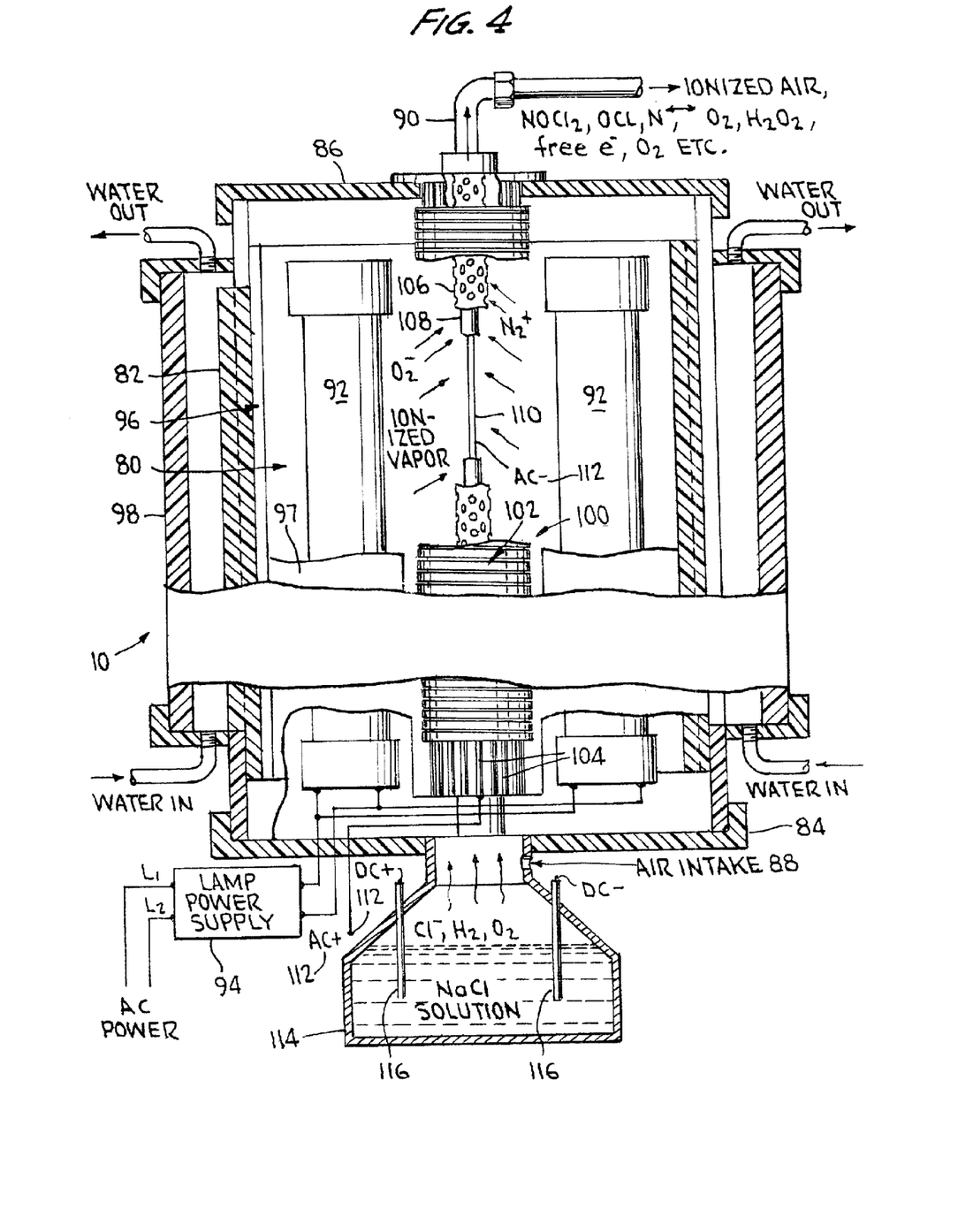
FIG. 4 is a part-sectional view of a second embodiment of an improved unit for generating streams of various species of ionized oxygen and nitrogen vapor ions, again as may be employed in implementing the invention.
Figure 5:
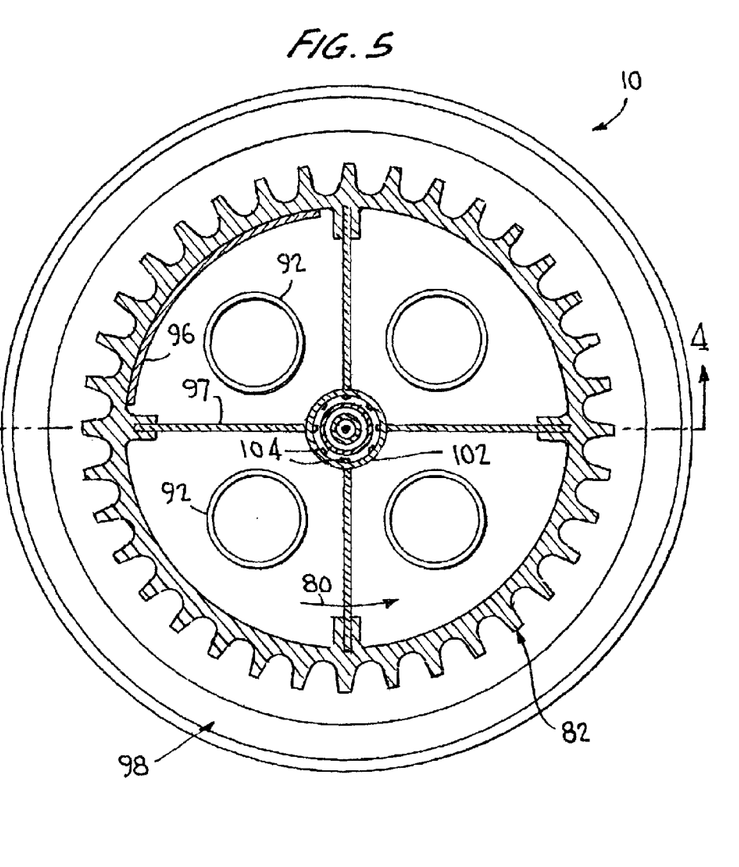
FIG. 5 is a cross-sectional view of the FIG. 4 vapor ion generator unit.

As discussed briefly above, the function of the ion generator 10 is to provide a stream of various highly reactive species of oxygen and nitrogen ions in air. A preferred form of ion generator 10, which also incorporates a brine electrolysis unit for producing chlorine ions, is shown in FIGS. 4 and 5; as mentioned above, this can be supplanted or supplemented by a separate brine electrolysis unit 16; detailed in FIG. 7 and discussed below. The basic principle of operation of ion generator 10 is as discussed in applicant's prior patents, that is, exposure of a stream of air to ultraviolet radiation (UV) causes ionization to take place, but further improvements are provided in the embodiment shown in FIGS. 4 and 5.

Thus, the ion generator 10 includes an inner volume 80 defined by a generally tubular reactor 82, capped at either end by lower and upper caps 84 and 86. An air flow pathway is defined by an entrance port 88 in communication with the lower end of volume 80, and an outlet port 90 in communication with the upper end of volume 80. Air flow may be motivated by compressor 12 (FIG. 1). Supported within volume 80 are one or more (four in the embodiment shown) high-intensity UV lamps 92, powered by power supply 94 so as to emit short wavelength, high energy UV. A substantial fraction of the oxygen and nitrogen drawn into entry port 88 is ionized by exposure to the UV as the air stream flows past lamps 92 on its way to exit port 90. To increase the efficiency of exposure, the inner surface of tubular reactor 82 may be polished, so as to reflect the UV effectively, or, if polishing is not feasible, it may be lined with stainless-steel sheet metal as indicated at 96 (FIG. 5). Polished stainless steel may also be used for reflective dividers 97. More specifically, in the preferred embodiment shown, tubular reactor 82 is an aluminum extrusion having a finned outer surface for efficient heat exchange with cooling water confined against the outer surface of member 82 by a water jacket 98.

To further improve the efficiency of ionization, and thus to accelerate the reaction of the ions with the microorganisms to be destroyed, the air flow path is constrained so that the air flows into a coaxial assembly of a perforated outer tube 106, preferably formed of stainless steel, a tubular ceramic insulator 108 and an inner solid conductor 110. The air stream including the ionized components is withdrawn from the end of the interior of tube 106 and an AC power supply (indicated schematically by positive and negative connections 112) is connected across perforated tube 106 and solid wire 110. This power supply typically provides up to 10,000 volts at up to 20,000 Hz; very little current flows, so that the power requirements are reasonable, but a high-intensity field is provided. As the vapor stream including ions of oxygen and nitrogen (and chlorine, as below) is drawn through the annular space between tube 106 and insulator 108, and experiences the electric field provided thereacross by power supply 112, some fraction of the ions experience an increase in their ionic state, i.e., they become more highly ionized and hence more reactive. This has the effect of further increasing their efficacy in destroying the microorganisms when the gas stream thus produced s later mixed with the water to be treated. If desired, e.g., to improve the uniformity of gas dispersement, a tubular baffle member 100 can be provided, outside of the assembly of tube 106, insulator 108, and solid conductor 110. In the embodiment shown, baffle 100 is formed by winding a wire 102 spirally over longitudinal forming wires 104. Successive coils of wire 102 are spaced from one another, so that air inlet passages forming a generally spiral pattern are provided.

The brine electrolysis unit shown simply comprises a tank 114 containing a brine solution and fitted with two electrodes 116 connected to a DC power supply. As indicated, electrolysis of the brine causes reactive species of ionized chlorine, oxygen, and hydrogen to be released, which flow upwardly and join the air stream entering via port 88, and which are then further ionized by the high-intensity field between perforated tube 106 and rod 110.

As will be appreciated, the gas generator of FIGS. 4 and 5 is water-cooled, in that water flowing within water jacket 98 will cool the outer finned member 82. If this degree of heat removal is not needed, that is, in smaller installations, an air-cooled gas generator shown in FIG. 3 may be used. In this embodiment, four parallel UV lamps connected to power supply 83 may be disposed in each of two sealed tubes 82. The lamps are preferably disposed in close proximity to one another; according to the applicants observation, this has the effect of creating a magnetic interaction between the lamps which is beneficial in efficiently ionizing the gas atoms, although the invention is not to be bound by this observation. Each unit may be fitted with the reflective inner baffles 97 and provided with a reflective inner surface 96, as in the FIGS. 4 and 5 embodiment, to ensure efficient absorption of the UV, and may also comprise the central assembly of perforated tube 106, ceramic insulator 108, and central rod 110, with AC power supply 112, also as in FIGS. 4 and 5. Air to be ionized passes through the tubes 82 and the NI—OX stream thus formed is withdrawn as indicated at 90 for mixing with the water stream to be treated.

As mentioned, FIG. 7 shows an exploded view of a preferred brine electrolysis unit, which can be used in lieu of or in addition to the brine electrolysis unit provided as part of the ion generator of FIGS. 4 and 5. The brine generator of FIG. 7 comprises a number of planar members Reassembled sandwich-fashion, as illustrated. The outer members 120 are stainless steel slate, e.g., approximately 12 by 18 inches in overall dimension. Disposed inwardly of these are two Delrin plastic sheets 122, providing insulation, and inward of these are two foraminous electrodes 124, formed, e.g., of stainless steel wire mesh, with members in good electrical contact therewith extending out of the "sandwich" to enable electrical connection. The innermost member 126 is a semi-permeable membrane formed, e.g., of a porous polyacrylite material, available from various manufacturers. The sandwich s assembled using a series of bolts around its periphery, and a thick layer of epoxy is provided around the periphery to provide a good seal. Piping connections are made as indicated to allow for inflow of the brine solution essentially 5–50% of ordinary food-grade salt in water, and for withdrawal of the ionized oxygen, chlorine, and hydrogen that are released due to electrolysis when a DC current is applied across the two screens.

As above, the ionized gas streams produced according to the invention are mixed with the water stream to be treated, and oxidize and kill all manner of biological contaminats. The killed and/or disinfected microorganisms and other contaminants can then be removed from the contaminated water stream in one or more of several separation devices, which can often be incorporated into the mixing vessel in which the vapor ion injection and contact mixing take place. Electro-coalescence can be employed as above to cause the contaminants to flocculate, precipitate, and settle, simplifying their removal DC electrostatically-chargeable plates may be employed to assist in the electrolysis of salt and water forming the chlorine and oxygen vapor ions, and they may also provide the additional surfaces for electro-precipitation removal of contaminants.

As mentioned above FIG. 1 shows one implementation of the invention, in a design for a typical "overall process" system arrangement. Item 10 is an ionized oxygen/nitrogen vapor ion generator unit, which can be that shown in more detail by FIG. 3, or that of FIGS. 4 and 5. Either produces a stream of various species of reactive vapor ions of oxygen and nitrogen from atmospheric air. As discussed above, it is believed that in practice of the invention, specifically, in generation of the NI—OX stream as above, a stream of negatively charged (ionized) oxygen known as Singlet Oxygen is produced. This species of ionized oxygen is referred to in the academic and published literature as the SUPEROXIDE ion. The SUPEROXIDE vapor ions have been determined to be capable of strong oxidation or reduction reactions Since it is believed that the SUPEROXIDE ion is formed in a stable fashion in practice of the invention, and is significant in achieving its beneficial effects, the method of the invention is sometimes referred to as applying the SUPEROXIDE Water Treatment Process. Again, use of this term is not intended to limit the invention.

Figure 6A:
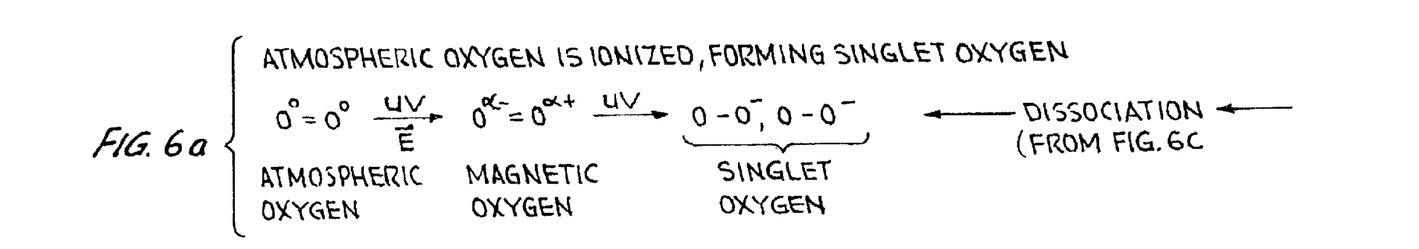
FIG. 6, comprising FIGS. 6(a)–(f), includes schematic equations illustrating formation of various ionic species that occur in operation of the vapor ion generator system of the invention.
Figure 6B:
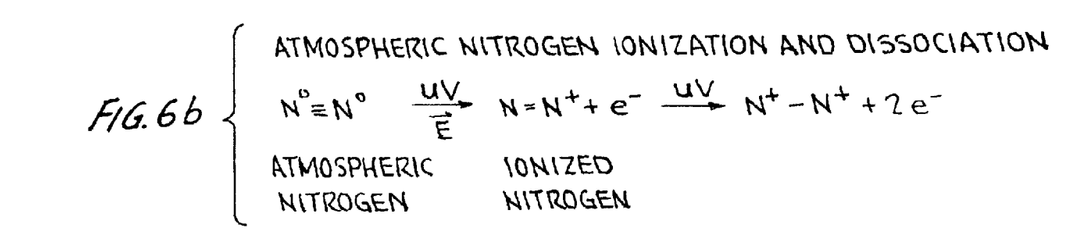
Figure 6C:
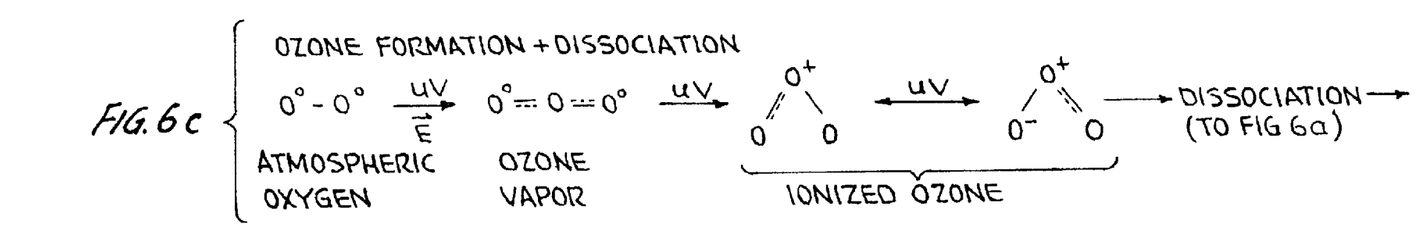
Figure 6D:
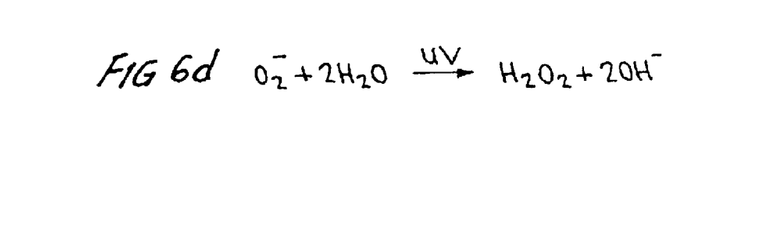
Figure 6E:
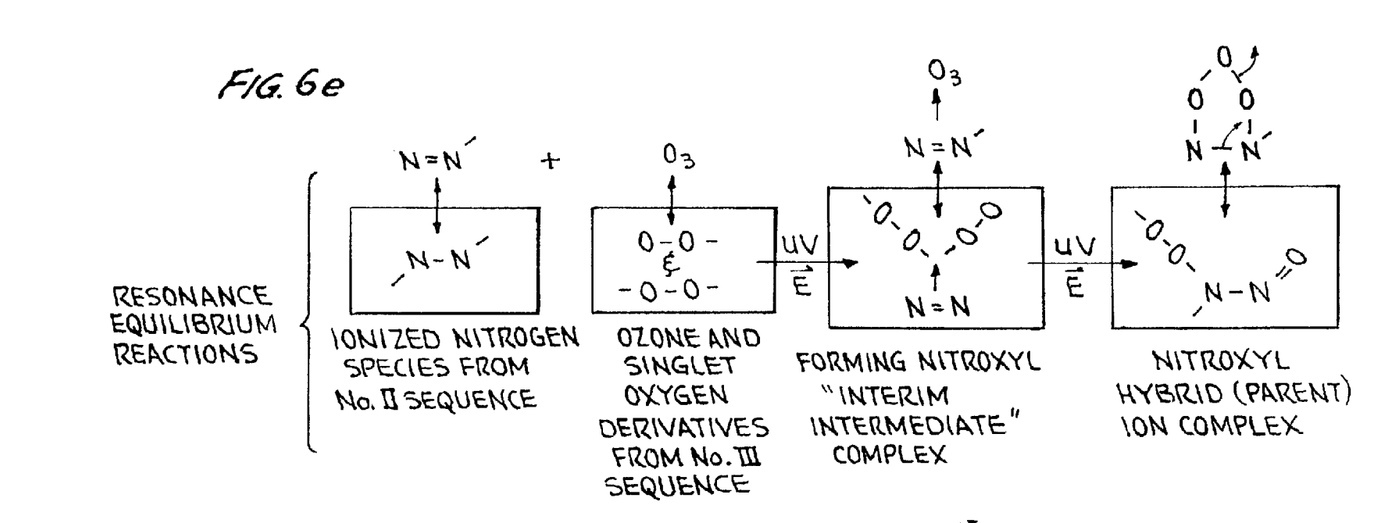
Figure 6F:
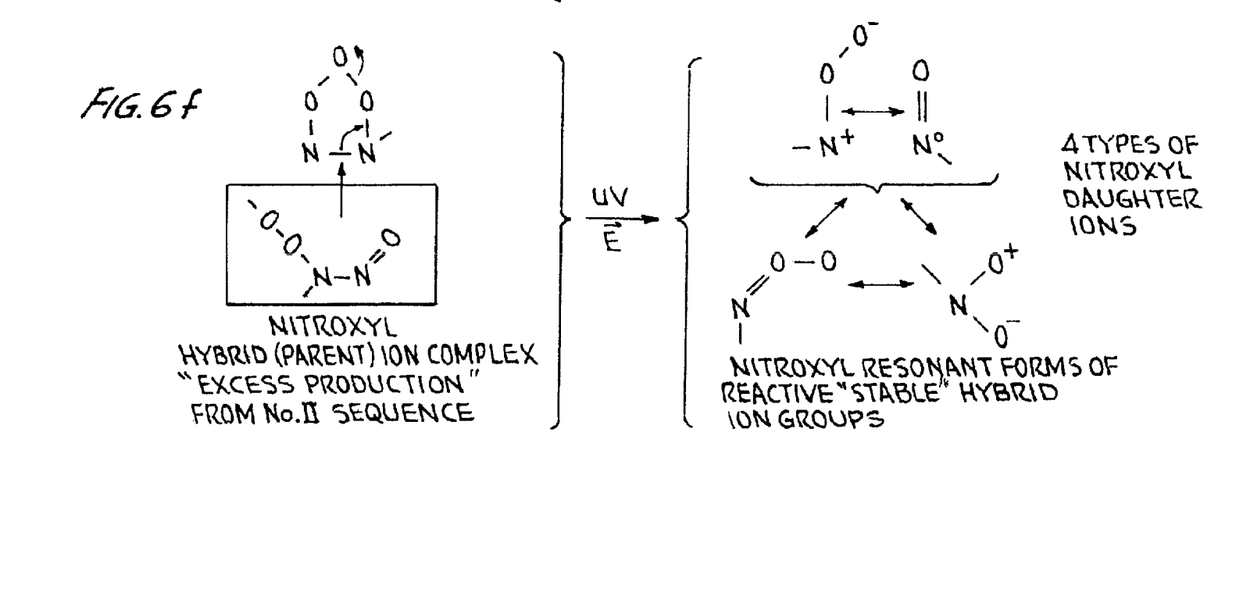

More specifically, FIG. 6, comprising FIGS. 6(a)–(f), illustrate what is believed to be representative of some of the major reaction sequences whereby various species including ionized oxygen and ionized nitrogen are formed in practice of the invention, although the invention is not to be limited thereby. FIG. 6(a) shows the reaction of atmospheric oxygen, under the influence of short-wavelength ultraviolet energy ("UV") and an electric field (denominated by a capital E with vector arrow above), to form a polarized or magnetic oxygen molecule, and thence dissociated, ionized singlet oxygen atoms; the latter are particularly reactive. FIG. 6(b) shows how atmospheric nitrogen can similarly be ionized by UV and the electric field, with the release of free electrons as well. FIG. 6(c) shows the formation of ozone which is itself extremely reactive, and also dissociates to form singlet oxygen atoms. FIG. 6(d) indicates that the singlet oxygen may react with water vapor to form hydrogen peroxide and hydroxide radicals. As illustrated by FIGS. 6(e) and (f) the ionized oxygen and nitrogen also react to form various combinations, referred to herein as NITROXYL ion species; again, use of the NITROXYL acronym is not intended to limit the invention, e.g., to embodiments of equipment or processes that may be offered by the inventor and his affiliates under that or a similar tradename or mark. As above, the stream of oxygen and nitrogen ions generated from atmospheric air is referred to in the drawings, and elsewhere, as the "NI—OX" stream, and the equipment producing it as the NI—OX equipment; again, use of this acronym does not limit the invention to embodiments of equipment or processes that may be offered by the inventor and his affiliates under that or a similar tradename or mark. The ionic species formed as outlined in FIG. 6 can then be mixed or chemically combined with chlorine ions released by electrolysis of brine in the equipment shown in FIGS. 1, 4, 7, or 8 as discussed previously.

Referring again to FIG. 1 the NI—OX stream of ionized oxygen and nitrogen is compressed by compressor 12, for injection into a brine mixing tank 14. Brine solution can be supplied to tank 14 from a reservoir 17 by metering pump 18. A portion of the mixture of brine (for grade sodium chloride salt solution) is drawn off and slowly metered into a brine electrolysis cell 16, as shown in FIG. 1 and detailed in FIG. 7. Low voltage DC power in the range of 8 to 12 volts and 4 to 8 amps is applied to the brine electrolysis cell 16 and causes ionized chlorine, oxygen, and hydrogen vapor ions to be released from the solution. This released vapor ion gas mixture is referred to in the drawings, FIG. 9, and elsewhere, as the "CLORIN" vapor ion stream; again, use of this term as shorthand herein is not to limit the invention. As noted, in an alternative electrolysis cell configuration embodiment shown in FIG. 4, the generation of ionized chlorine, oxygen, and hydrogen vapor ions by electrolysis of brine may be performed in the same apparatus as that in which the NI—OX stream of ionized nitrogen and oxygen vapor ions from air is being produced. In FIG. 1, the CLORIN stream is piped to the closed brine tank 14 and further interacts and combines with the NI—OX generated vapor ion stream.

FIG. 9 lists at 11 the principal active ion groups which are believed to be formed in the combined gas stream; again, however, the invention is not to be so limited. This highly reactive ion stream, referred to as the CLORINOXYL ion group, is then injected and mixed with the contaminated water to be treated. The ionized treatment gases that are generated are extremely effective in killing all manner of microorganisms in the water stream, thus essentially sterilizing the contaminated water or wastewater stream in accordance with the objects of the invention.

Figure 2:
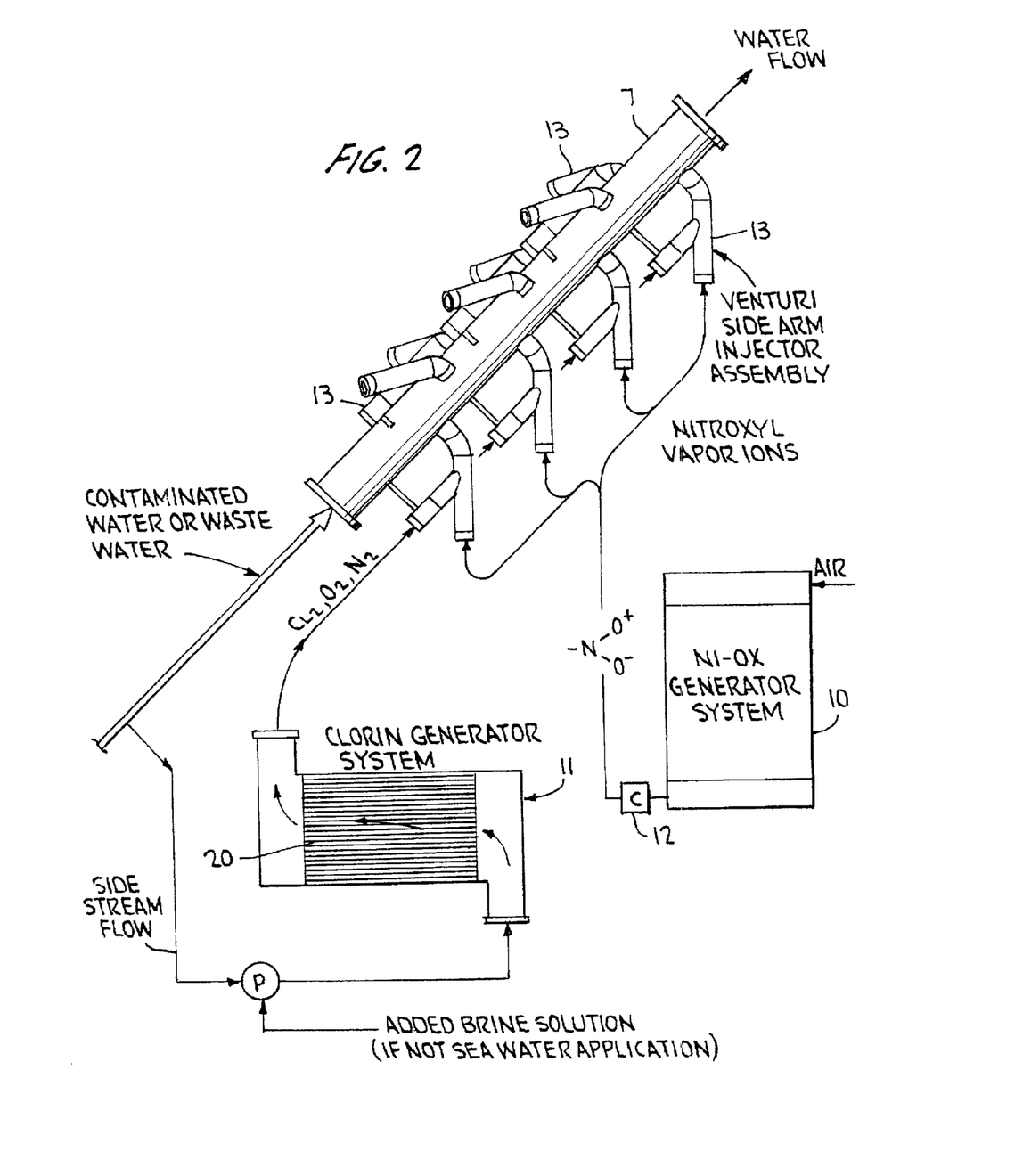
FIG. 2 shows a schematic diagram of a second embodiment of a water treatment system incorporating the invention.
Figure 10A:
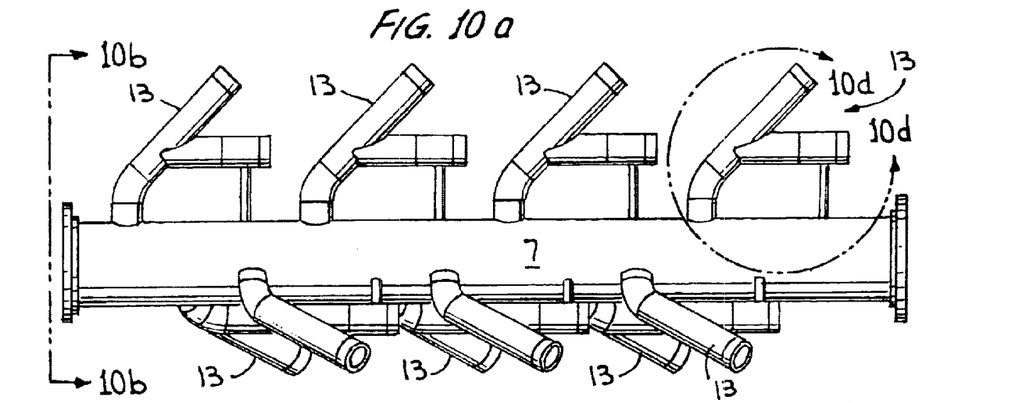
FIG. 10, comprising FIGS. 10 (a)–(e), shows several views of an injection mixer for mixing the ionized vapor with a water stream to be treated that is useful in practice of the invention.
Figures 10B, 10D:
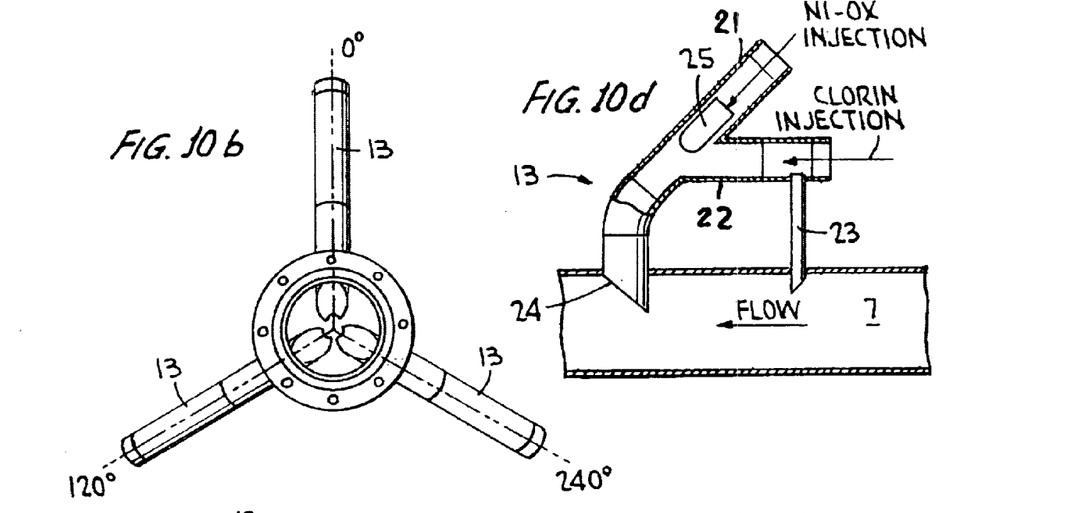
Figure 10C:
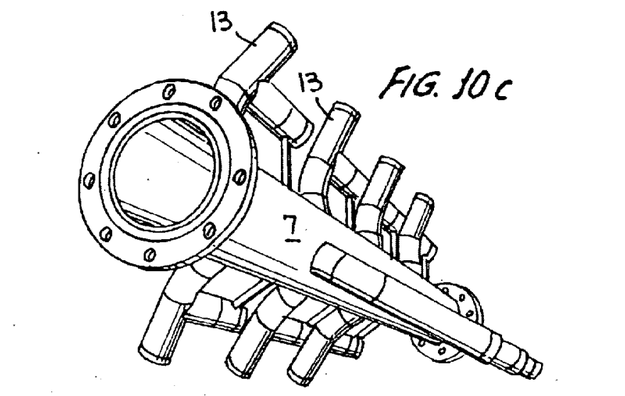
Figure 10E:
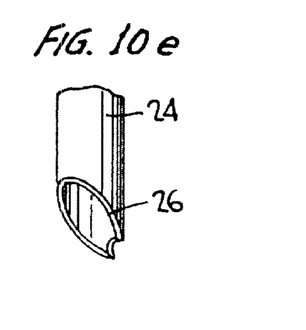

FIG. 2 shows a further system arrangement, useful with extremely high flow rates, e.g., millions of gallons per day, and FIG. 10 comprising FIGS. 10(a)–(e), details the preferred arrangement of the mixing chamber thereof As indicated, a stream of water to be treated flows down the lumen of a large pipe 7; to give an idea of the scale at which the invention may be applied, pipe section 7 may be from 4 to 24 inches in diameter and from 4 to 12 or more feet long. The pipe 7 is fitted with a number of injector assemblies 13 detailed in the cross-sectional view of FIG. 10(d). The pipe 7 and injector assemblies may be made of steel pipe and welded together. Each injector 13 is connected to NI—OX and CLORIN generator, 10 and 11 respectively, as shown in FIGS. 2 and 10(d), the injectors are disposed spirally around the pipe 7, as illustrated in FIGS. 10(a), (b) and (c) so as to impose a spiral flow path to the water passing therethrough and ensuring good mixing.

As shown by FIG. 10 (d), the injector assemblies each comprise separate connections, illustrated at 21 and 22, for the NI—OX and CLORIN streams, so that the CHLORINOXYL stream is formed in situ; this gives it maximum efficiency since the reactive molecules have very little time to react with one another, dissociate or the like, but instead are immediately mixed with the stream of water to be treated, and so achieve maximum disinfection. Further, introduction of the gas streams into the fast-flowing water stream provides a venturi suction effect, further ensuring good mixing. More specifically, a tube 23 may be arranged as shown, with an angled mouth open toward the incoming flow, to withdraw a portion of the incoming flow; this portion is directed into the CLORIN injection tube 22, and impacts against a porous plastic diffuser 25. The NI—OX stream flows through diffuser 25, ensuring that it is finely divided entering the water stream as small bubbles, ensuring good mixing. Similarly, arranging the flow of the CLORIN stream so as to impact the diffuser 25 ensures good swirling of the incoming streams so that they are thoroughly mixed, Furthermore, withdrawal of the portion of the main flow by tube 23 reduces the pressure in the main tube 7, creating a venturi pulling the gas mixture in by way of injection pipe 24. As shown by FIG. 10(*e*), the tip of the gas injection pipe 24 is notched, as indicated at 26; this increases the suction created by the venturi, and further ensures good mixing.

While several preferred embodiments of the invention and several alternatives have been discussed in detail, those of skill in the art will recognize that further improvements thereon are possible without departure from the spirit and scope of the claims.

What is claimed is:

1. A system for the disinfection of water contaminated by the presence of microorganisms and biological contaminants, comprising:
    means for exposing a stream of air to short-wavelength ultraviolet radiation, whereby ions of oxygen and nitrogen are formed in said stream of air;
    means for electrolysis of a brine, whereby a stream of chlorine ions is produced;
    means for collecting said stream of chlorine ions;
    means for mixing said stream of chlorine ions with said stream of air containing ions of oxygen and nitrogen, forming a mixed gas stream; and
    means for mixing said mixed gas stream with said stream of water to be disinfected.

2. The system of claim 1, wherein said means for electrolysis of a brine comprises a vessel containing a number of spaced parallel plates of conductive material, alternating ones of said plates being connected to a source of direct current, such that an electric field exists between alternating pairs of plates, whereby brine in said vessel is electrolyzed, releasing ionized chlorine.

3. The system of claim 1, wherein said means for exposing a stream of air to short-wavelength ultraviolet radiation comprises an elongated tubular member having an air intake at one end and an outlet for a stream of air containing ionized atoms at the other end, a number of lamps for emitting short-wavelength ultraviolet radiation extending within said tubular member, and a power supply for energizing said lamps.

4. The system of claim 3, wherein said tubular member is lined with UV-reflective material, whereby said UV is repeatedly reflected until absorbed by gas atoms in said stream of air.

5. The system of claim 4, wherein baffles of said UV-reflective material are further disposed between said lamps.

6. The system of claim 3, wherein said air stream containing ionized atoms is withdrawn from one end of a hollow cylindrical member disposed within said tubular member, and wherein a rod member is disposed coaxially within said hollow cylindrical member, an AC potential being applied across said hollow cylindrical member and said rod member.

7. The system of claim 3, wherein said tubular member comprises an aluminum tube fitted with first and second end caps defining a closed cylindrical member.

8. The system of claim 7, further comprising a water jacket member fitted around said aluminum tube, and arranged to be sealed with respect to said first and second end caps, whereby cooling water can flow around said aluminum tube.

9. The system of claim 3, wherein said means for exposing a stream of air to short-wavelength ultraviolet radiation further comprises a vessel for containing a quantity of brine, said vessel including first and second electrodes for connection to a power supply, whereby ionized chlorine gas atoms are released from said brine, said vessel being disposed so that said chlorine atoms join the air stream entering said intake of said elongated tubular member.

10. The system of claim 2, wherein said stream of air containing ionized oxygen and nitrogen is mixed with the stream of water to be treated before admission of said stream of water to be treated to a settling vessel, wherein solids can settle out for removal, and wherein said stream of water flows from said setting vessel to said vessel containing a number of spaced parallel plates of conductive material, alternating ones of said plates being connected to a direct current power supply, whereby ionized chlorine is released by electrolysis and mixed with said stream of water, and whereby solids remaining in said stream of water are agglomerated on said spaced parallel plates.

11. The system of claim 1, wherein said means for mixing said stream of ionized gas with said stream of water to be disinfected comprises a section of pipe along which said stream of water is passed, and a number of injector assemblies connected to said section of pipe, each injector assembly being connected to said means for exposing a stream of air to short-wavelength ultraviolet radiation, whereby ions of oxygen and nitrogen are formed in said stream of air, and to said means for collecting said stream of chlorine ions, whereby each injector assembly comprises said means for mixing said stream of chlorine ions with said stream of air containing ions of oxygen and nitrogen, forming a mixed gas stream.

12. The system of claim 1, wherein said means for electrolysis of a brine, whereby a stream of ionized chlorine ions is produced, comprises an electrolysis cell comprising a pair of foraminous metallic electrodes spaced from one another by a porous membrane, this assembly being sealed in a vessel, whereby when said vessel is filled with brine and direct current power is applied across said electrodes, ionized chlorine gas is released from said brine.

13. A method for the disinfection of water contaminated by the presence of microorganisms and biological contaminants, comprising the steps of:
    exposing a stream of air to short-wavelength ultraviolet radiation, whereby ions of oxygen and nitrogen are formed in said stream of air;
    providing and electrolyzing a brine, whereby a stream of chlorine ions is produced;
    collecting said stream of chlorine ions;
    mixing said stream of chlorine ions with said stream of air containing ions of oxygen and nitrogen, forming a mixed gas stream; and
    mixing said mixed gas stream with said stream of water to be disinfected, whereby said microorganisms and biological contaminants are destroyed.

14. The method of claim 13, wherein said step of electrolyzing a brine is performed by disposing a quantity of brine in a vessel containing a number of spaced parallel plates of conductive material, and connecting alternating ones of said plates to a source of direct current, such that an electric field exists between alternating pairs of plates, whereby brine in said vessel is electrolyzed, releasing ionized chlorine.

15. The method of claim 13, wherein said step of exposing a stream of air to short-wavelength ultraviolet radiation is performed by admitting said stream of air into an elongated tubular member having an air intake at one end and an outlet for a stream of air containing ionized atoms at the other end, wherein a number of lamps for emitting short-wavelength ultraviolet radiation are located within said tubular member, and energizing said lamps.

16. The method of claim 15, wherein said tubular member is lined with UV-reflective material, whereby said UV is repeatedly reflected until absorbed by gas atoms in said stream of air.

17. The method of claim 16, wherein baffles of said UV-reflective material are further disposed between said lamps.

18. The method of claim 15, wherein said air stream containing ionized atoms is withdrawn from one end of a hollow cylindrical member disposed within said tubular member, and wherein a rod member is disposed coaxially within said hollow cylindrical member, and comprising the further step of applying an AC potential across said hollow cylindrical member and said rod member.

19. The method of claim 15, wherein said tubular member comprises an aluminum tube fitted with first and second end caps defining a closed cylindrical member, wherein a water jacket member is fitted around said aluminum tube, and sealed with respect to said first and second end caps, and comprising the further step of causing cooling water to flow around said aluminum tube.

20. The method of claim 15, comprising the further steps of connecting a vessel for containing a quantity of brine to said means for exposing a stream of air to short-wavelength ultraviolet radiation, and connecting first and second electrodes in said vessel containing brine to a power supply, whereby ionized chlorine gas atoms are released from said brine, and causing said ionized chlorine atoms to join the air stream entering said intake of said elongated tubular member.

21. The method of claim 14, comprising the further steps of mixing said stream of air containing ionized oxygen and nitrogen with the stream of water to be treated before admission of said stream of water to be treated to a settling vessel, wherein solids can settle out for removal, and causing said stream of water to flow from said setting vessel to said vessel containing a number of spaced parallel plates of conductive material, alternating ones of said plates being connected to a direct current power supply, whereby ionized chlorine is released by electrolysis and mixed with said stream of water, and whereby solids remaining in said stream of water are agglomerated by the electric field extending between said spaced parallel plates.

22. The method of claim 13, wherein said step of mixing said mixed gas stream with said stream of water to be disinfected is performed employing a section of pipe along which said stream of water is passed, wherein a number of injector assemblies are connected to said section of pipe, and by connecting each injector assembly to said stream of air having been exposed to short-wavelength ultraviolet radiation, whereby said stream of air contains ions of oxygen and nitrogen, and to said stream of chlorine ions, whereby said stream of chlorine ions is mixed in each injector assembly with said stream of air containing ions of oxygen and nitrogen, forming a mixed gas stream.

23. The method of claim 13, wherein said step of electrolyzing a brine, whereby a stream of chlorine ions is produced, is performed employing an electrolysis cell comprising a pair of foraminous metallic electrodes spaced from one another by a porous membrane, this assembly being sealed in a vessel, and by filling said vessel with brine and applying direct current power across said electrodes, whereby ionized chlorine gas is released from said brine.

* * * * *